United States Patent Office 2,712,546
Patented July 5, 1955

2,712,546

MANUFACTURE OF ALKYL ALUMINIUM HALIDES

Harold Coates, Wombourne, William Hubert Hunter, Shepton Mallet, and Bryan Topley, Kinver, near Stourbridge, England, assignors to the Minister of Supply, in Her Majesty's Government of the United Kingdom of Great Britain and Northern Ireland, London, England No Drawing. Application September 9, 1952, Serial No. 308,725

Claims priority, application Great Britain December 12, 1951

16 Claims. (Cl. 260—448)

This invention relates to the manufacture of alkyl aluminium halides and particularly to the production of alkyl aluminium dihalides.

These compounds are valuable as intermediates for the manufacture of some organic phosphorus compounds.

One object of the invention is to produce alkyl aluminium dihalides especially methyl aluminium dichloride in an improved manner.

The method available in the literature (v. Grosse and Mavity, J. Org. Chem., 1940, 5, 106; Hnizda and Kraus, J. Amer. Chem. Soc., 1938, 60, 2276; Adkins and Stanley, J. Amer. Chem. Soc., 1951, 73, 2854) for the preparation of methyl aluminium dichloride consists in the reaction of methyl chloride with aluminium turnings to give a mixture of methyl aluminium dichloride and dimethyl aluminium chloride, as indicated in the following equation:

$$2Al + 3CH_3Cl = CH_3AlCl_2 + (CH_3)_2AlCl \qquad (1)$$

This equimolecular mixture is usually referred to as the "sesquichloride," and is converted to methyl aluminium dichloride by adding the calculated amount of aluminium chloride and heating to complete the process by the conversion of the dialkyl chloride to the monoalkyl dichloride as indicated in the following equation:

$$CH_3AlCl_2 + (CH_3)_2AlCl + AlCl_3 = 3CH_3AlCl_2 \qquad (2)$$
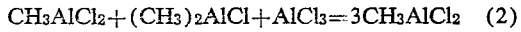

This known method of production has certain disadvantages and we have found that this compound and similar compounds namely alkyl aluminium dihalides may be prepared in a manner more convenient for large scale operation by a process as hereinafter described.

The present invention consists in a process for the manufacture of alkyl aluminium dihalides wherein a dialkyl aluminium monohalide is reacted with a halogen whereby the dialkyl monohalide is converted into a monoalkyl aluminium dihalide.

Moreover, the invention provides a process for the manufacture of an alkyl aluminium dihalide wherein an alkyl sesquihalide of aluminium is reacted with the corresponding elementary halogen to yield the alkyl aluminium dihalide.

Thus the present invention in one form consists in a process for the manufacture of methyl aluminium dichloride according to which the sesquichloride is reacted with chlorine whereby the dimethyl aluminium chloride is converted into methyl aluminium dichloride, which is then separated from the products of the reaction.

The reaction is indicated by the following equation.

$$CH_3AlCl_2 + (CH_3)_2AlCl + Cl_2 = 2CH_3AlCl_2 + CH_3Cl \qquad (3)$$
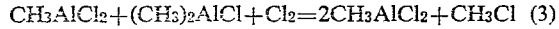

The methyl chloride produced in this reaction may be recovered for re-use in the reaction indicated in Equation 1 above.

Since the methyl aluminium dichloride is usually used in a solvent the preparation may be conveniently carried out in the solvent to be used in the subsequent reactions.

Alternatively, in a modified form of the process according to the invention, aluminium and an alkyl halide are reacted in the presence of a halogen to produce the required alkyl aluminium dihalide. Thus in the reaction indicated in Equation 1 chlorine may be introduced simultaneously with the methyl chloride so that reaction takes place and methyl aluminium dichloride is produced according to the following equation:

$$Cl_2 + 2CH_3Cl + 2Al = 2CH_3AlCl_2 \qquad (4)$$
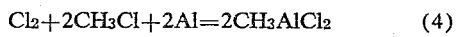

Moreover, according to the invention the halogenation process may also be used to convert the monohalide to the dihalide in an inert solvent. For instance, dimethyl aluminium chloride may be thus converted by reaction with elementary chlorine to produce methyl aluminium dichloride and methyl chloride, as follows:

$$(CH_3)_2AlCl + Cl_2 = CH_3AlCl_2 + CH_3Cl \qquad (5)$$

The methyl chloride may be recovered for re-use.
The invention as illustrated by the following examples.

Example 1

A solution of 136 gm. of methyl aluminium sesquichloride in 253 gm. benzene was treated gradually at 0–5° C. with a solution of 47 gm. of chlorine in 235 gm. benzene, with stirring. After completion of the reaction the benzene was distilled off and the residue fractionated to give 128 gm. of the dichloride $CH_3AlCl_2$; B. P. 100° C./100 mm. This represents a yield of 86%.

Example 2

A solution of 113 gm. of methyl aluminium monochloride $(CH_3)_2AlCl$ in 222 gm. benzene at 0° C. was reacted with 87 gm. of chlorine in 300 cc. benzene. After completion of the reaction the benzene was distilled off and the residue fractionated to give 116 gm. of the dichloride B. P. 96–100° C./100 mm. (yield 84%).

It will be understood that the invention is not intended to be restricted to the production methyl aluminium dichloride. Other alkyl dihalides of aluminium may be produced in an analogous manner.

What we claim is:

1. Process for the production of alkyl aluminum dihalides, which process comprises reacting a dialkyl aluminum monohalide with sufficient elementary halogen to convert at least a substantial proportion of said monohalide to alkyl aluminum dihalide.

2. Process which comprises reacting an alkyl aluminum sesquihalide with a sufficient amount of the corresponding halogen to convert at least a substantial proportion of the monohalide component of said sesquihalide to an alkyl aluminum dihalide.

3. Process which comprises reacting aluminum with an alkyl halide to produce an equimolecular mixture of an alkyl aluminum dihalide and dialkyl aluminum monohalide and reacting the said mixture with sufficient elementary halogen to convert at least a substantial proportion of the said dialkyl aluminum halide component into a monoalkyl aluminum dihalide.

4. Process which comprises reacting aluminum with an alkyl halide in the presence of sufficient free halogen to combine with at least a substantial proportion of said alkyl halide and aluminum to produce an alkyl aluminum dihalide.

5. Process which comprises reacting a dialkyl aluminum chloride with a sufficient amount of chlorine to convert at least a substantial proportion of said chloride to a monoalkyl aluminum dichloride.

6. Process which comprises reacting dimethyl aluminum chloride with a sufficient amount of chlorine to convert at least a substantial proportion of said chloride to methyl aluminum dichloride.

7. Process which comprises reacting an alkyl aluminum sesquichloride with chlorine to convert at least a substantial proportion of the monohalide component of the said sesquichloride into alkyl aluminum dichloride.

8. Process which comprises reacting methyl aluminum sesquichloride with sufficient chlorine to convert the said sesquichloride wholly into methyl aluminum dichloride.

9. Process which comprises reacting aluminum with an alkyl chloride in the presence of sufficient elementary chlorine to combine with at least a substantial proportion of said alkyl chloride and aluminum to produce an alkyl aluminum dichloride.

10. Process which comprises reacting aluminum with methyl chloride in the presence of sufficient elementary chlorine to combine with at least a substantial proportion of said methyl chloride and aluminum to produce methyl aluminum dichloride.

11. A process for the production of alkyl aluminum dihalides which comprises dissolving a dialkyl aluminum monohalide in a solvent which is inert under the reaction conditions and adding thereto a sufficient amount of elementary halogen to react with at least a substantial proportion of said monohalide and convert said monohalide to alkyl aluminum dihalide, and allowing the mixture to react.

12. A process according to claim 11 wherein the halogen is added gradually and the mixture is cooled while the reaction takes place.

13. A process according to claim 11 wherein the halide is a chloride and the halogen is chlorine.

14. A process according to claim 12 wherein the halide is a chloride and the halogen is chlorine.

15. A process of producing methyl aluminum dichloride which comprises dissolving methyl aluminum sesquichloride in benzene, adding gradually thereto a solution of chlorine in benzene in sufficient quantities to convert substantially all said sesquichloride to methyl aluminum dichloride, maintaining the mixture at a temperature of about 0° C., and allowing the mixture to react.

16. A process of producing methyl aluminum dichloride comprising dissolving dimethyl aluminum monochloride in benzene, adding gradually thereto a solution of chlorine in benzene in sufficient quantities to convert substantially all said monochloride methyl aluminum dichloride.

References Cited in the file of this patent

UNITED STATES PATENTS

| | | |
|---|---|---|
| 2,180,345 | Blue | Nov. 21, 1939 |
| 2,270,292 | Grosse | Jan. 20, 1942 |
| 2,271,956 | Ruthruff et al. | Feb. 3, 1952 |

OTHER REFERENCES

Grosse et al.: Jour. Org. Chem., vol. 5, pages 106–121, 1940.